Figure 1:
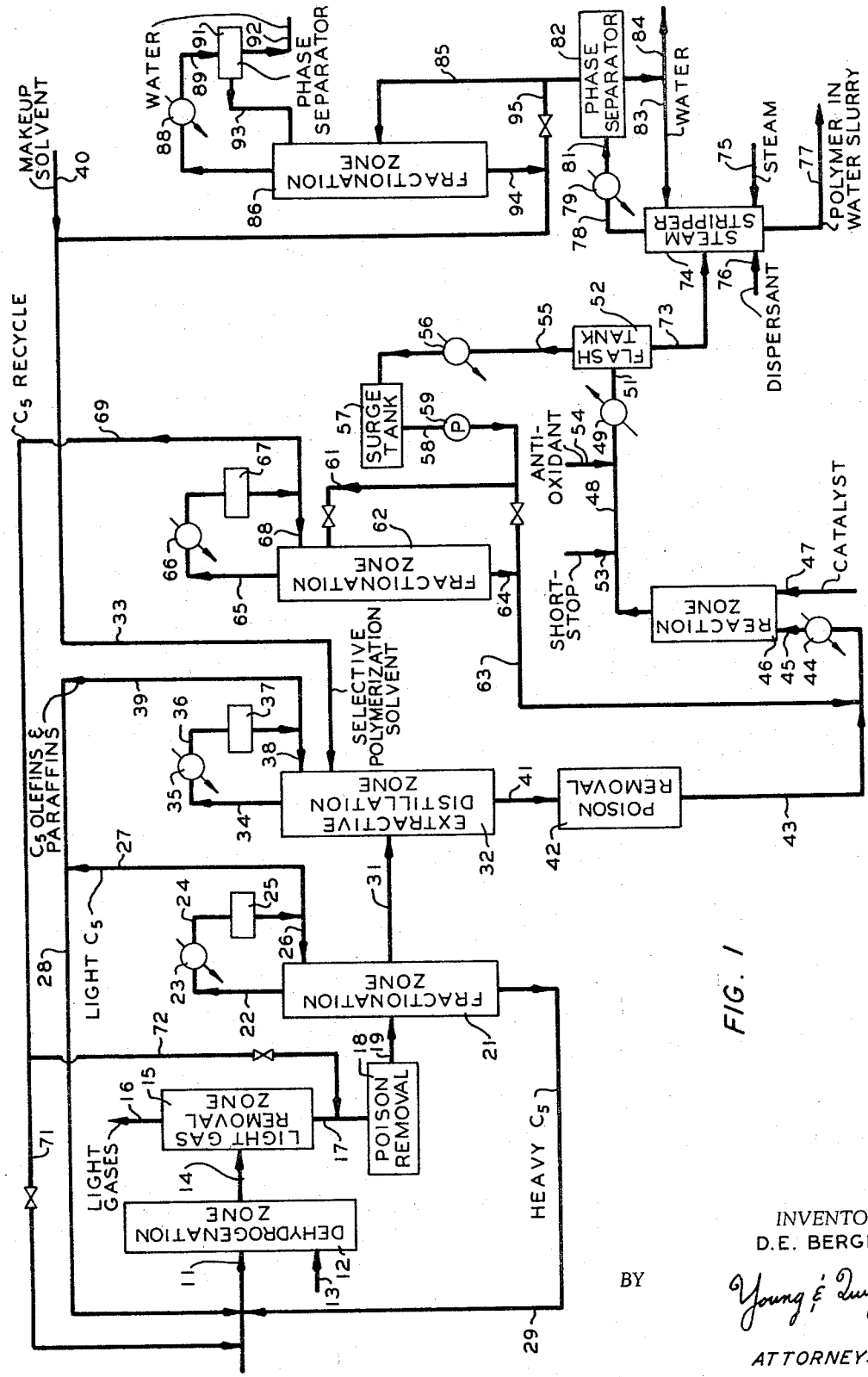

INVENTOR.
D.E. BERGER
BY Young & Quigg
ATTORNEYS

Jan. 3, 1967   D. E. BERGER   3,296,241
RECOVERY AND POLYMERIZATION OF HYDROCARBON MONOMER
Filed Aug. 20, 1962   3 Sheets-Sheet 2

INVENTOR.
D. E. BERGER
BY
Young & Quigg
ATTORNEYS

Jan. 3, 1967 D. E. BERGER 3,296,241
RECOVERY AND POLYMERIZATION OF HYDROCARBON MONOMER
Filed Aug. 20, 1962 3 Sheets-Sheet 3

INVENTOR.
D. E. BERGER
BY Young & Quigg
ATTORNEYS

United States Patent Office 3,296,241
Patented Jan. 3, 1967

3,296,241
RECOVERY AND POLYMERIZATION OF
HYDROCARBON MONOMER
Donald E. Berger, Bartlesville, Okla., assignor to Phillips
Petroleum Company, a corporation of Delaware
Filed Aug. 20, 1962, Ser. No. 217,792
17 Claims. (Cl. 260—94.2)

This invention relates to method and apparatus for separating a component from a mixture containing said component. In one aspect the invention relates to the separation of isoprene from a mixture containing isoprene. In another aspect the invention relates to a polymerization process wherein the monomer is separated from a mixture containing the monomer by the utilization of the polymerization reaction solvent as an extractive distillation solvent.

One conventional method for obtaining isoprene comprises dehydrogenating a feed of mixed isoamylenes, separating out the $C_4$ and lighter fraction, subjecting the remaining $C_5$ fraction to a fractionation step to obtain a stream comprising isoprene in admixture with various isoamylenes, subjecting said stream to a non-volatile absorptive material such as furfural, ethylene glycol, methyl Carbitol, or the like to absorb the isoprene, and recovering a stream of high purity isoprene from the absorptive material rich in isoprene by heat stripping. Difficulties are sometimes experienced in such a multi-step method due to thermal degradation of the isoprene in the heat stripping operation and the necessity of separating substantially all of the absorptive material from the isoprene. Even small amounts of absorptive materials such as those enumerated in the isoprene product renders such product unsuitable for utilization as the monomer feed in many isoprene polymerization processes and especially in stereospecific isoprene polymerization processes.

In accordance with the present invention it has been discovered that these difficulties can be overcome by the utilization of the same material for the solvent in the polymerization process and for the extractive distillation absorptive material. Such a process eliminates the need for heat stripping the isoprene from the absorptive material and the requirement of having an isoprene product substantially free of absorptive material, as well as the process step of preparing the monomer-solvent polymerization feed stream.

It has also been discovered that such a process can be further enhanced through the utilization of a novel control system therefor. In a first embodiment of the control system, the $C_5$ feed is introduced into a fractionation column, the rate of internal reflux is varied to maintain the concentration of isoprene in the overhead stream at a predetermined low value, the rate of withdrawal of the kettle product is manipulated responsive to the composition thereof to maintain the concentration of isoprene therein at a predetermined low value, and a side stream is withdrawn at a rate responsive to the ratio of the flow rate of isoprene in the side stream to the flow rate of isoprene in the feed stream to recover in the side stream a predetermined percentage of the isoprene in the feed stream. In a second embodiment of the control system, the concentrations of isoprene in the overhead stream and in the kettle product are controlled in the same manner as in the first embodiment, while the side stream is withdrawn at a rate responsive to the difference between the rate of flow of the feed stream and the sum of the rates of flow of the overhead stream and the kettle product stream. In both embodiments of the control system, the side stream is introduced into an extractive distillation column wherein it is contacted with an absorptive medium, and, in accordance with the invention, the rate of withdrawal of the bottom stream is manipulated responsive to the ratio of isoprene to absorptive medium contained therein and the rate of introduction of absorptive medium into the column is manipulated responsive to the concentration of isoprene in the overhead stream to maintain such concentration at a predetermined low value.

Accordingly it is an object of this invention to provide a novel process for the separation of a component from a mixture containing the component. Another object of the invention is to provide improved method and apparatus for the separation of isoprene from a mixture of $C_5$ hydrocarbons. Yet another object of the invention is the provision of a process and means for recovering isoprene from a mixture of $C_5$ hydrocarbons by extractive distillation without the requirement of subjecting the absorptive material rich in isoprene to heat stripping to recover the isoprene. A still further object of the invention is the substantial reduction if not elimination of thermal degradation of isoprene in a process for the recovery of isoprene from a mixture of $C_5$ hydrocarbons. Another object of the invention is the provision of improved process and apparatus for obtaining isoprene for utilization in a polymerization system by means of extractive distillation without the requirement that substantially all of the absorptive material be removed from the isoprene. It is a still further object of the invention to provide an improved procedure resulting in a commercially acceptable process for production of polyisoprene characterized by a minimum number of process steps.

Other objects, aspects, and advantages of the invention will be apparent from a study of the disclosure, the drawings and the appended claims to the invention.

Figure 2:
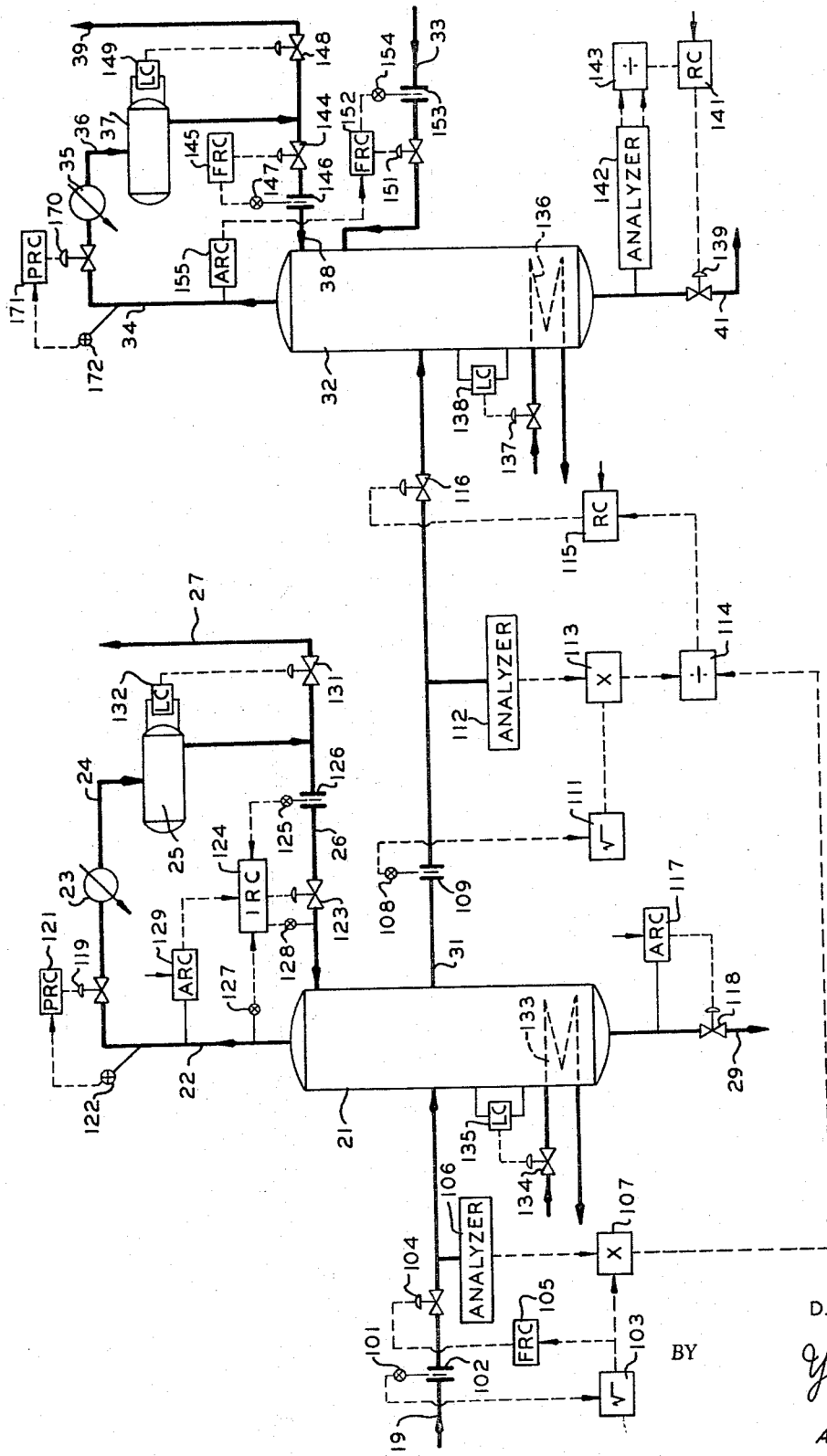
Figure 3:
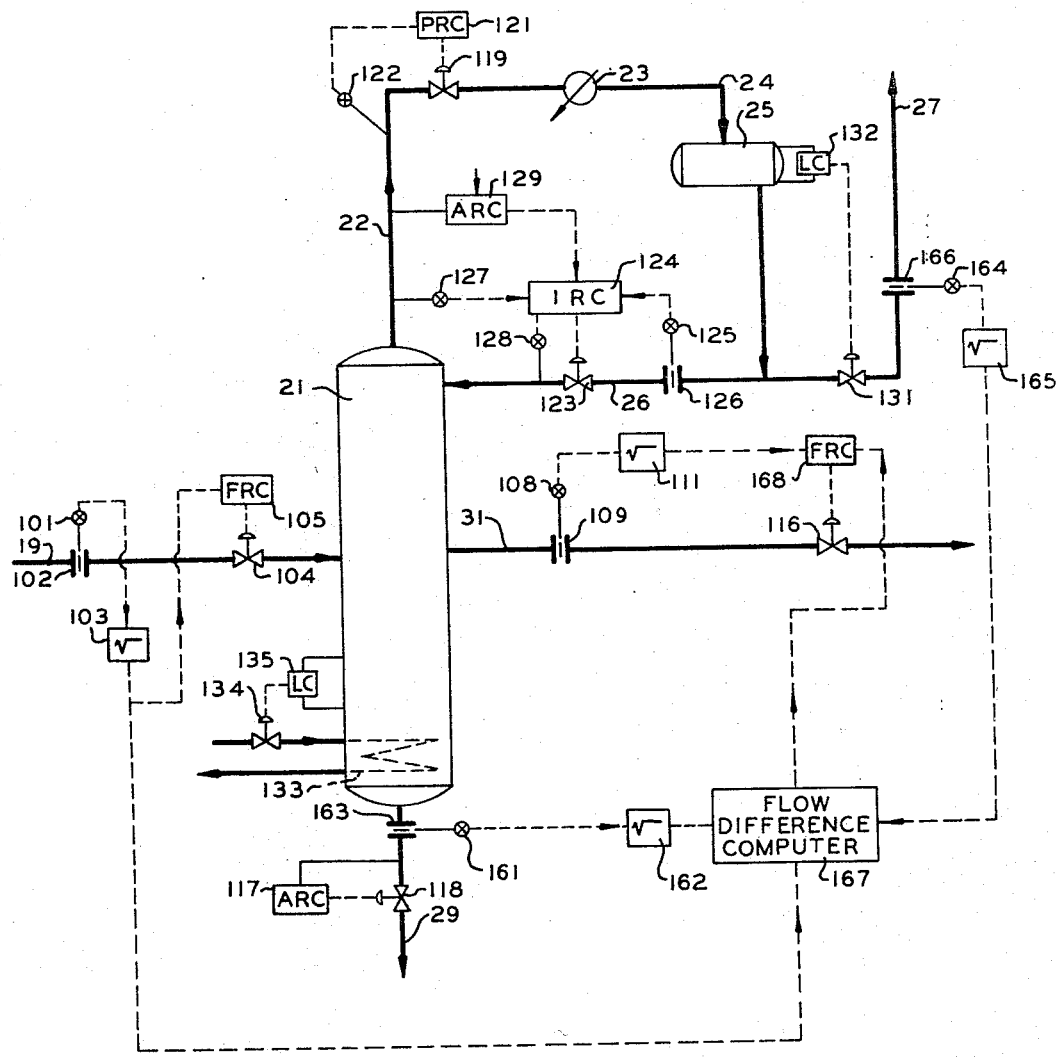

In the drawings FIGURE 1 is a diagrammatic representation of a process for recovering and polymerizing isoprene in accordance with the invention and FIGURES 2 and 3 are diagrammatic representations of first and second embodiments, respectively, of a control system in accordance with the invention.

Referring to the drawing in detail and to FIGURE 1 in particular, a feed stream containing principally 2-methyl-butene-1, 2-methyl-butene-2, and 3-methyl-butene-1 is passed by way of line 11 into dehydrogenation zone 12 wherein the feed stream is contacted with a suitable dehydrogenation catalyst under dehydrogenation conditions. Broadly, any suitable olefin dehydrogenation catalyst can be utilized in zone 12, one example being a catalyst composed of 3 percent by weight chromium oxide, 30 percent by weight potassium carbonate, and the balance iron oxide. As most catalysts of this type are steam active, steam can be introduced into zone 12 by way of line 13. Another suitable catalyst is a potassium base material composed of 51 to 59 percent by weight potassium carbonate, 39 to 47 percent by weight iron oxide and 1 to 10 percent by weight chromium oxide. With this latter catalyst, satisfactory conversion of methyl-butenes to isoprene is obtained at a temperature in the range of 1100 to 1250° F., a liquid hourly space velocity in the range of 1 to 10 and a steam to hydrocarbon ratio in the range of 5:1 to 20:1. Pressure is not critical where the steam dilution is employed, and the process can be conveniently operated at atmospheric pressure. Under these conditions, a highly satisfactory conversion of methylbutenes to isoprene is attained in the dehydrogenation zone 12. The reaction effluent from zone 12 is withdrawn by way of line 14 and passed into light gas removal zone 15, wherein methane hydrogen, and other light gases are taken overhead by way of line 16, the bottom product being passed by way of line 17 into and through poison removal zone 18 and through line 19 into fractionation zone 21. If steam is utilized in zone 12, a condenser and settler for water should be interposed between dehydrogenation zone 12 and light gas removal zone 15. In poison removal zone 18 the isoprene-containing feed stream is contacted with any suitable material, such as copper ammonium acetate, copper ammonium formate, calcium hydride, alkali metal hydrides, lithium aluminum hydrides, and aluminum alkyls. Poison removal zone 18 functions to remove poisons such as acetylenes and cyclopentadiene.

An overhead stream containing principally $C_5$ hydrocarbons lower boiling than isoprene and only a small amount of isoprene, for example on the order of 1 mol percent, is withdrawn from fractionation zone 21 by way of line 22 and passed through condenser 23 and line 24 into accumulator 25. A portion of the condensate from accumulator 25 is passed by way of line 26 into an upper portion of fractionation zone 21 as reflux therefor, while the remainder of the condensate is passed by way of lines 27, 28 and 11 as recycle to dehydrogenation zone 12. A kettle product stream containing principally $C_5$ hydrocarbons higher boiling than isoprene and only a small amount of isoprene, for example on the order of 1 mol percent, is withdrawn from fractionation zone 21 and passed by way of lines 29 and 11 as recycle to dehydrogenation zone 12. A side stream comprising primarily isoprene with a minor amount of $C_5$ hydrocarbons is withdrawn from fractionation zone 21 and passed by way of line 31 into extractive distillation column 32. The side stream can be withdrawn from either a tray liquid phase or a tray vapor phase of fractionation zone 21. It is presently preferred to take a vapor stream below the feed entry point or a liquid stream above the feed entry point, preferably the latter. Poison removal zone 18 can be located between zone 21 and zone 32 on line 31, if desired.

In extractive distillation column 32 the hydrocarbon feed stream from line 31 is contacted with a selective polymerization solvent which is introduced into column 32 by way of line 33. The nature of the selective polymerization solvent is dictated by the catalyst system utilized in the polymerization process, that is, it must be substantially inert with respect to monomer, catalyst, and polymer. While oxygen, halogen, nitrogen or sulfur substituted hydrocarbons would be effective selective solvents for separating isoprene from a $C_5$ hydrocarbon mixture, they are reactive with many of the catalyst systems utilized in the subsequent polymerization of the isoprene, and for this reason the recovered isoprene product stream must be substantially free of such materials. Materials which are suitable for utilization as the selective polymerization solvent in accordance with the invention include aromatic hydrocarbons having from 6 to 8 carbon atoms per molecule, cycloparaffinic hydrocarbons having from 5 to 8 carbon atoms per molecule, and cycloolefinic hydrocarbons having from 5 to 8 carbon atoms per molecule. Specific examples include benzene, toluene, xylene, ethyl benzene, cyclopentane, cyclohexane, methylcyclopentane, ethylcyclopentane, dimethylcyclopentane, methylcyclohexane, ethylcyclohexane, dimethylcyclohexane, cyclopentene, cyclohexene, methylcyclopentene, ethylcyclopentene, dimethylcyclopentene, methylcyclohexene, ethylcyclohexene, dimethylcyclohexene and mixtures thereof. The presently preferred selective polymerization solvents are benzene, toluene, cyclohexane, cyclohexene and methylcyclopentane. Those especially preferred at the present time are benzene and toluene.

An overhead stream containing principally $C_5$ olefins and paraffins is withdrawn from column 32 by way of line 34 and passed through condenser 35 and line 36 into accumulator 37. A portion of the condensate from accumulator 37 is passed by way of line 38 into an upper portion of column 32 as reflux therefor, while the remainder of the condensate from accumulator 37 is passed by way of lines 39, 28 and 11 as recycle to dehydrogenation zone 12. A bottoms product comprising primarily isoprene and selective polymerization solvent is withdrawn from column 32 and passed by way of line 41 into and through poison removal zone 42 and then by way of line 43, cooler 44, and line 45 into reaction zone 46. Poison removal zone 42 can contain any suitable material, such as alumina, for the removal of water and other catalyst poisons as may be desired.

A suitable polymerization catalyst is introduced into reaction zone 46 by way of line 47. While any suitable polymerization catalyst can be utilized, a presently preferred catalyst comprises an organolithium compound dispersed in a hydrocarbon medium which boils in the range of 200 to 700° C., said organolithium compound having been formed by reacting lithium with a hydrocarbon compound having from 4 to 30, inclusive, carbon atoms, as disclosed in copending application Serial No. 137,013, filed by G. R. Kahle on September 11, 1961, now abandoned. The dispersion of organolithium initiator in the hydrocarbon dispersing medium is a very efficient initiator for the polymerization of isoprene and polymers thus produced having a consistently high cis content. The relatively high boiling or heavy hydrocarbon dispersing medium of the invention serves to coat the substantially insoluble organolithium particles and keeps them in a highly dispersed form. The organolithium compounds per se are pyrophoric but dispersion in the high-boiling hydrocarbon dispersing medium employed according to the invention renders them nonpyrophoric and consequently easy to handle. Initiators prepared in this manner give reproducible initiation and rates of polymerization. The solvent in which the organolithium initiator was originally prepared can be removed and replaced with a high-boiling hydrocarbon dispersing medium without impairing the effectiveness of the initiator in the subsequent polymerization reaction. The term "organolithium compounds," as used herein, includes the various lithium hydrocarbons, especially the mono- and polylithium hydrocarbons that are active for the polymerization of dienes. The organolithium compounds that can be employed ordinarily contain from 1 to 4 lithium atoms per molecule. These organolithium compounds can be prepared in a hydrocarbon or polar medium in several ways, for example, by replacing halogen in an organic halide with lithium or by the direct addition of lithium to a double bond or by reacting an organic halide with a lithium-containing compound.

The hydrocarbons from which the organolithium compounds are prepared generally contain 4 to 30, inclusive, carbon atoms per molecule and when the parent hydrocarbon is an aromatic hydrocarbon it can contain alkyl substituents. The alkyl substituents can contain from 1 to 6 carbon atoms but the total carbon atoms in each alkyl group should not exceed 6 and no more than 3 alkyl groups should be present per molecule.

Specific examples of the organolithium compounds which are suitable initiators include lithiobenzene, lithiotriphenylmethane, 1,4-dilithiobenzene, 1,2-dilithio-1,2-diphenylethane, 1,4-dilithiobutane, and 1,4-dilithiocyclohexane. Other examples, characteristics, and method of preparation of the organolithium compounds are set forth in said application Serial No. 137,013, the description of which is incorporated herein by reference.

Polymerization can be effected in reaction zone 46 at a temperature ranging from about −100 to about 150° C., preferably from about −75 to about 75° C. The particular temperature employed depends on both the monomer and the initiator used in the polymerization. The amount of initiator employed during polymerization will vary appreciably but generally it will range from about 0.1 to 200 gram atoms of lithium per 100 grams of monomer with the preferred range being from about 0.25 to 60 gram atoms of lithium per 100 grams of monomer. The pressure of the reaction need be only that necessary to maintain the materials in the liquid phase. A wide variety of polymers may be prepared which range from liquids to rubbery materials, the latter being presently preferred. The polyisoprene polymers have a cis content of at least 65 percent and preferably about 70 percent or more.

Reaction effluent is withdrawn from reaction zone 46 by way of line 48 and passed through heater 49 and line 51 into flash tank 52. A catalyst-inactivating or short-stop material, such as rosin acid, is added to the reaction effluent by way of line 53 so as to inactivate the catalyst and prevent further formation of polymer. An antioxidant, such as phenyl-beta-naphthylamine, can be added to the reaction effluent by way of line 54. In flash tank 52 $C_5$ hydrocarbons and a portion of the solvent are flashed and passed by way of line 55 and cooler 56 into surge tank 57. The mixture of solvent and hydrocarbons is withdrawn from surge tank 57 by way of line 58 and pump 59 and passed by way of line 61 into fractionation zone 62 and/or by way of lines 63 and 43, cooler 44 and line 45 as direct recycle into reaction zone 46. Fractionation zone 62 functions to separate the feed thereto into an overhead stream comprising primarily any isoamylenes contained in the mixture in line 61 and a kettle product comprising primarily isoprene and solvent. The kettle product is passed by way of line 64 into line 63, while the overhead stream is passed by way of line 65 and condenser 66 into accumulator 67. A portion of the condensate from accumulator 67 is passed by way of line 68 into an upper portion of fractionation zone 62 while the remainder of the condensate is withdrawn by way of line 69 and passed by way of line 71 and 11 as recycle to dehydrogenation zone 12 and/or by way of line 72 and 17 into poison removal zone 18 and then by way of line 19 into fractionation zone 21 depending upon the concentration of isoprene contained therein.

A mixture of polyisoprene and solvent is withdrawn from flash tank 52 by way of line 73 and introduced into steam stripper 74 wherein it is subjected to stripping steam from line 75. If desired, a suitable dispersant, such as, for example, the sodium salt of a copolymer of diisobutylene and maleic anhydride can be introduced into steam stripper 74 by way of line 76. A bottoms stream comprising a slurry of polyisoprene in water is withdrawn from steam stripper 74 by way of line 77 and passed to further separation (not shown) for recovery of the polyisoprene. A mixture of vaporized solvent and steam is withdrawn from steam stripper 74 by way of line 78 and passed through cooler 79 and line 81 into phase separator 82. Water is withdrawn from phase separator 82 and a portion of the water is introduced into an upper portion of steam stripper 74 by way of line 83 while the remainder of the water is withdrawn from the system by way of line 84. Solvent containing a small amount of water is withdrawn from phase separator 82 and passed by way of line 85 into fractionation drying zone 86. An overhead stream is withdrawn from fractionation drying zone 86 by way of line 87 and passed through condenser 88 and line 89 into phase separator 91. Water is withdrawn from phase separator 91 and from the system by way of line 92, while solvent is withdrawn from phase separator 91 and passed by way of line 93 into an upper portion of fractionation drying zone 86. A kettle product comprising solvent is withdrawn from fractionation drying zone 86 and passed by way of lines 94 and 33 into extractive distillation zone 32. If a small amount of water is desired in the solvent introduced into extractive distillation zone 32 to enhance the selectivity of the solvent, a portion of the solvent and water mixture from phase separator 82 can be passed through line 95 into line 33. Makeup solvent can be added to conduit 33 by way of conduit 40 as desired.

The high-cis-polyisoprenes produced in accordance with this invention can be compounded by known methods such as have been used in the past for compounding rubber. Vulcanization agents, vulcanization accelerators, accelerator activators, reinforcing agents, antioxidants, softeners or plasticizers, fillers and other compounding ingredients such as have been normally employed in rubbers, both natural and synthetic, can likewise be used in the compounds of this invention. The cis-polyisoprene polymers have utility in applications where both natural and synthetic rubbers are used. For example, they can be used in the manufacture of automobile tires, gaskets and other rubber articles.

Referring now to FIGURE 2, wherein there is shown an inventive automatic control system for the inventive process just described, differential pressure transmitter 101 produces an output signal representative of the pressure drop across orifice 102 located in line 19, the output signal being applied to the input of square root extractor 103. Valve 104 located in line 19 is manipulated by flow recorder controller 105 responsive to the output of square root extractor 103 to maintain the rate of flow through line 19 at a substantially constant desired value. A sample is continuously withdrawn from line 19 and analyzed in analyzer 106, which produces an output signal representative of the concentration of isoprene in the fluid flowing through line 19. The output of square root extractor 103, which is representative of the rate of flow of fluid through line 19, is multiplied in multiplier 107 by the output signal from analyzer 106 to obtain a signal representative of the flow rate of isoprene through line 19. Differential pressure transmitter 108 produces an output signal representative of the pressure drop across orifice 109 located in line 31, the output signal being applied to the input of square root extractor 111. A sample is continuously withdrawn from line 31 and analyzed in analyzer 112, which produces an output signal representative of the concentration of isoprene in the fluid flowing through line 31. The output of square root extractor 111 is multiplied in multiplier 113 by the output signal from analyzer 112 to obtain a signal representative of the rate of flow of isoprene through line 31. The output signal from multiplier 113 is divided in divider 114 by the output signal from multiplier 107 to obtain a signal representative of the percent recovery of isoprene by way of line 31. The latter signal is applied to an input of ratio recorder controller 115 wherein it is compared with a set point representative of the desired percent recovery of isoprene. Valve 116 located in line 31 is manipulated responsive to the output of controller 115 to maintain the percent recovery of isoprene substantially constant.

A sample is continuously withdrawn from line 29 and analyzed in analyzer recorder controller 117, which produces an output signal related to the concentration of isoprene in line 29. Valve 118, located in line 29, is manipulated responsive to the output signal from controller 117 to maintain the concentration of isoprene in line 29 at a predetermined value, such as for example, 1 mol percent. Valve 119, located in line 22, is manipulated by pressure recorder controller 121 responsive to the pressure in line 22 as determined by pressure transmitter 122. Valve 123, located in line 26, is manipulated by internal reflux computer-controller 124 responsive to the rate of flow in line 26 as determined by differential pressure transmitter 125 mounted across orifice 126 in line 26 and to the difference in temperature of the fluids in lines 22 and 26 as determined by temperature sensing devices 127 and 128, respectively. A sample is continuously taken from line 22 and analyzed in analyzer recorder controller 129 which manipulates the set point of internal reflux 124 to maintain the concentration of isoprene in the fluid flowing through line 22 at a predetermined value, such as for example, 1 mol percent. The rate of withdrawal of condensate through line 27 is controlled by valve 131 which is manipulated by liquid level controller 132 responsive to the liquid level in accumulator 25 to maintain such liquid level substantially constant. The rate of flow of a heat exchanging fluid, such as steam, through coil 133 in a lower portion of fractionation zone 21 is controlled by valve 134 which is manipulated by liquid level controller 135 responsive to the liquid level in the reboiler section of fractionation zone 21 to maintain such liquid level substantially constant.

Similarly the rate of flow of heat exchanging fluid through coil 136 in a lower portion of extractive distillation zone 32 is controlled by valve 137 which is manipulated by liquid level controller 138 responsive to the liquid level in the lower portion of extractive distillation zone 32 to maintain such liquid level substantially constant. The rate of withdrawal of the solvent-isoprene mixture through line 41 is controlled by valve 139 which is manipulated by difference computer 167 is applied to the set point input of flow rate recorder controller 168 wherein it is compared with the output of square root extractor 111. Valve 116 is manipulated by controller 168 to maintain the rate of flow through line 31 equal to the difference between the rate of flow through line 19 and the sum of the rates of flow through lines 29 and 27.

The following example is presented in further illustration of the invention but is not to be construed unduly in limitation thereof.

PROCESS MATERIAL BALANCE IN POUNDS PER MINUTE

| Component | 19 | 27 | 29 | 31 | 33 | 39 | 41 43 | 45 | 51 48 | 61 55 | 73 | 71 69 | 63 64 | 77 | 78 81 | 85 | 92 | 94 | 40 |
|---|---|---|---|---|---|---|---|---|---|---|---|---|---|---|---|---|---|---|---|
| 3-methyl butene-1 | 7.4 | 7.4 | | | | | | | | | | | | | | | | | |
| 2-methyl butene-1 | 33.8 | 15.0 | | 18.8 | | 16.3 | 2.5 | 3.5 | 3.5 | 3.5 | | 2.5 | 1.0 | | | | | | |
| 2-methyl butadiene 1-3 | 61.3 | 0.2 | 0.4 | 60.6 | | 1.6 | 59.0 | 90.0 | 32.0 | 32.0 | | 1.0 | 31.0 | | | | | | |
| 2-methyl butene-2 | 57.5 | | 52.5 | 5.0 | | 1.0 | 4.0 | 6.0 | 6.0 | 6.0 | | 4.0 | 2.0 | | | | | | |
| Toluene | | | | | 480.0 | 1.0 | 479.0 | 718.0 | 718.0 | 240.0 | 478.0 | 1.0 | 239.0 | | 478.0 | 478.0 | | 478.0 | 2.0 |
| Polyisoprene | | | | | | | | | 580.0 | | 58.0 | | | 58.0 | | | | | |
| Water | | | | | | | | | | | | | | | 60.0 | 310.0 | 4.0 | 4.0 | |
| | 160.0 | 22.6 | 53.0 | 84.4 | 480.0 | 19.9 | 544.5 | 817.5 | 817.5 | 281.5 | 536.0 | 8.5 | 273.0 | 118.0 | 788.0 | 482.0 | 4.0 | 478.0 | 2.0 |

NOTE: Fractionation zone 62 can be periodically operated for total removal of $C_5$'s to prevent recycle buildup of non reactants, such as 2-methyl butene-2 in the polymerization-flash-fractionation-recycle system, or can be bypassed if desired.

ratio recorder controller 141 responsive to the ratio of isoprene to solvent in said mixture as determined by analyzer 142 and divider 143 to maintain the ratio of isoprene to solvent substantially constant. A sample from line 41 is continuously analyzed in analyzer 142 which produces first and second output signals representative of the concentration of isoprene and of the solvent, respectively, the output signals being applied to divider 143 to obtain the ratio thereof. Thus the monomer-solvent feed to the polymerization reaction zone 46 can be obtained directly from extractive distillation zone 32 already mixed in the desired ratio, for example, about ⅛.

The rate of flow of reflux through line 38 is controlled by valve 144 which is manipulated by flow rate recorder controller 145 responsive to the pressure drop across orifice 146 as determined by differential pressure transmitter 147 to maintain such rate of flow substantially constant. The rate of withdrawal of condensate through line 39 is controlled by valve 148 which is manipulated by liquid level controller 149 responsive to the liquid level in accumulator 37 to maintain such liquid level substantially constant. The rate of flow of solvent through line 33 is controlled by valve 151 which is manipulated by flow rate recorder controller 152 responsive to the pressure drop across orifice 153 located in line 33 as determined by differential pressure transmitter 154 to maintain such rate of flow substantially equal to a desired value. A sample is continuously withdrawn from line 34 and analyzed in analyzer recorder controller 155 which produces an output signal to vary the set point of controller 152 and thus the rate of flow of solvent through line 33 to maintain the concentration of isoprene in the fluid flowing through line 34 at a predetermined value, such as for example, 8 mol percent. Valve 170, located in line 34, is manipulated by pressure recorder controller 171 responsive to the pressure in line 34 as determined by pressure transmitter 172.

Referring now to FIGURE 3, wherein there is set forth an automatic control system for fractionation zone 21, alternative to that shown in FIGURE 2, differential pressure transmitter 161 transmits to square root extractor 162 a signal representative of the pressure drop across orifice 163 in line 29, while differential pressure transmitter 164 transmits to square root extractor 165 a signal representative of the pressure drop across orifice 166 in line 27. The output signals of square root extractors 103, 162, and 165, which are representative of the rates of flow through lines 19, 29 and 27, respectively, are applied to respective inputs of flow difference computer 167 which produces an output signal representative of the difference between the rate of flow through line 19 and the sum of the rates of flow through lines 29 and 27. The output signal from flow

OPERATING CONDITIONS

| | Pressure, p.s.i.a. | Temperature, ° F. | |
|---|---|---|---|
| | | Top | Bottom |
| Zone 21 | 35 | 137 | 153 |
| Zone 32 | 30 | 128 | 260 |
| Zone 46 | 25 | 90 | |
| Flash Tank 52 | 20 | 245 | |
| Stripper 74 | 20 | 210 | |
| Zone 62 | 30 | 133 | 264 |
| Zone 86 | 25 | 221 | 257 |

While the invention has been described in terms of the purification and polymerization of isoprene, the invention is also applicable to the purification and polymerization of other hydrocarbon monomers, such as conjugated dienes containing from 4 to 10 carbon atoms. Examples of conjugated dienes which can be utilized include 1,3-butadiene, 2,3-dimethyl-1,3-butadiene, 1,3-pentadiene, 2-methyl-1,3-pentadiene and the like.

As noted above, the drawings are merely diagrammatic and are not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not means that such a piece of equipment is intended to be omitted simply because it does not appear in the drawings. Suffice to say, the drawings are for illustrative purposes, as is the description thereof.

Reasonable variation and modification are possible within the scope of the foregoing disclosure, the drawings and the appended claims to the invention.

I claim:

1. A process for polymerizing a conjugated diene hydrocarbon monomer containing from 4 to 10 carbon atoms per molecule comprising introducing a stream comprising said hydrocarbon monomer and other hydrocarbons into an extractive distillation zone, contacting said stream in said extractive distillation zone with a selective, hydrocarbon, polymerization solvent, withdrawing from said extractive distillation zone a solvent stream rich in said hydrocarbon monomer, contacting said solvent stream rich in said hydrocarbon monomer with a suitable polymerization catalyst under polymerization reaction conditions, and recovering the resulting polymer from the polymerization reaction effluent, said selective, hydrocarbon, polymerization solvent being substantially inert with respect to said polymerization catalyst and said hydrocarbon monomer and possessing selective absorption for said hydrocarbon monomer in comparison to said other hydrocarbons.

2. A process for polymerizing a conjugated diene hydrocarbon monomer containing from 4 to 10 carbon atoms per molecule comprising introducing a mixture comprising said hydrocarbon monomer and other hydrocarbons into a fractionation zone, withdrawing from said fractionation zone a stream having said hydrocarbon monomer concentrated therein, introducing said stream into an extractive distillation zone, contacting said stream in said extractive distillation zone with a selective, hydrocarbon, polymerization solvent, withdrawing from said extractive distillation zone a solvent stream rich in said hydrocarbon monomer, contacting said solvent stream rich in said hydrocarbon monomer with a suitable polymerization catalyst under polymerization reaction conditions, and recovering the resulting polymer from the polymerization reaction effluent, said selective hydrocarbon polymerization solvent being substantially inert with respect to said polymerization catalyst and said hydrocarbon monomer and possessing selective absorption for said hydrocarbon monomer in comparison to said other hydrocarbons.

3. A process in accordance with claim 2 wherein said selective, hydrocarbon polymerization solvent is selected from the group consisting of aromatic hydrocarbons having from 6 to 8 carbon atoms per molecule, cycloparaffinic hydrocarbons having from 5 to 8 carbon atoms per molecule, and cycloolefinic hydrocarbons having 5 to 8 carbon atoms per molecule.

4. A process for polymerizing a conjugated diene hydrocarbon monomer containing from 4 to 10 carbon atoms per molecule comprising introducing a mixture of said hydrocarbon monomer and other hydrocarbons into a fractionation zone and therein fractionating said mixture to obtain a first overhead stream comprising hydrocarbons lighter than said monomer, a kettle product comprising hydrocarbons heavier than said monomer, and a sidedraw stream comprising said monomer and a minor amount of other hydrocarbons; condensing said first overhead stream; returning a portion of the thus condensed first overhead stream into an upper portion of said fractionation zone as reflux therefor; introducing said sidedraw stream into an extractive distillation zone and therein contacting said sidedraw stream with a selective, hydrocarbon, polymerization solvent; withdrawing from said extractive distillation zone a second overhead stream comprising said other hydrocarbons; condensing said second overhead stream; returning a portion of the thus condensed second overhead stream into an upper portion of said extractive distillation zone as reflux therefor; withdrawing from said extractive distillation zone a bottoms product comprising said monomer and solvent; contacting said bottoms product with a suitable polymerization catalyst under polymerization reaction conditions; and recovering the resulting polymer; said selective, hydrocarbon, polymerization solvent being substantially inert with respect to said monomer and said polymerization catalyst and possessing selective absorption for said monomer in comparison to said other hydrocarbons.

5. A process in accordance with claim 4 further comprising controlling the rate of withdrawal of said sidedraw stream to recover in said sidedraw stream a predetermined percentage of the monomer contained in said mixture.

6. A process in accordance with claim 4 further comprising controlling the rate of withdrawal of said sidedraw stream responsive to the difference in the flow rate of said mixture and the sum of the rates of flow of said first overhead stream and said kettle product.

7. A process for polymerizing isoprene comprising introducing an isoprene concentrate stream into an extractive distillation zone; contacting said isoprene concentrate stream with a selective solvent in said extractive distillation zone, said solvent being selected from the group consisting of aromatic hydrocarbons having from 6 to 8 carbon atoms per molecule, cycloparaffinic hydrocarbons having from 5 to 8 carbon atoms per molecule, and cycloolefinic hydrocarbons having 5 to 8 carbon atoms per molecule; withdrawing from said extractive distillation zone a solvent stream rich in isoprene; contacting said solvent stream rich in isoprene with a suitable polymerization catalyst under suitable polymerization reaction conditions; and recovering polyisoprene from the polymerization reaction effluent.

8. A process for polymerizing isoprene comprising introducing a mixture of isoprene and other five carbon atom hydrocarbons into a fractionation zone; withdrawing from said fractionation zone an isoprene concentrate stream; introducing said isoprene concentrate stream into an extractive distillation zone; contacting said isoprene concentrate stream with a selective solvent in said extractive distillation zone, said solvent being selected from the group consisting of aromatic hydrocarbons having from 6 to 8 carbon atoms per molecule, cycloparaffinic hydrocarbons having from 5 to 8 carbon atoms per molecule, and cycloolefinic hydrocarbons having 5 to 8 carbon atoms per molecule; withdrawing from said extractive distillation zone a solvent stream rich in isoprene; contacting said solvent stream rich in isoprene with a suitable polymerization catalyst under suitable polymerization reaction conditions; and recovering polyisoprene from the polymerization reaction effluent.

9. A process in accordance with claim 8 wherein said polymerization catalyst comprises an organolithium compound dispersed in a hydrocarbon medium which boils in the range of 200 to 700° C., said organolithium compound having been formed by reacting lithium with a hydrocarbon compound having from 4 to 30, inclusive, carbon atoms.

10. A process in accordance with claim 8 further comprising manipulating the rate of withdrawal of said solvent stream rich in isoprene from said extractive distillation zone responsive to the ratio of isoprene to solvent in said solvent stream rich in isoprene to maintain said ratio substantially constant.

11. A process in accordance with claim 8 wherein said solvent is benzene.

12. A process in accordance with claim 8 wherein said solvent is toluene.

13. A process for separating isoprene from a mixture thereof with other five carbon atom hydrocarbons comprising introducing said mixture into a fractionation zone; withdrawing from said fractionation zone an isoprene concentrate stream; introducing said isoprene concentrate stream into an extractive distillation zone; contacting said isoprene concentrate stream with a selective solvent in said extractive distillation zone, said solvent being selected from the group consisting of aromatic hydrocarbons having from 6 to 8 carbon atoms per molecule, cycloparaffinic hydrocarbons having from 5 to 8 carbon atoms per molecule, and cycloolefinic hydrocarbons having 5 to 8 carbon atoms per molecule; and withdrawing from said extractive distillation zone a solvent stream rich in isoprene.

14. A process for producing isoprene comprising subjecting a mixture of isoamylenes to a dehydrogenation catalyst in a dehydrogenation zone under dehydrogenation conditions; removing the reaction effluent from said dehydrogenation zone; separating light gases from the thus removed reaction effluent; introducing the remainder of the reaction effluent into a fractionation zone and therein fractionating said remainder to obtain a first overhead stream comprising five carbon atom hydrocarbons lighter than isoprene, a kettle product comprising five carbon atom hydrocarbons heavier than isoprene, and a sidedraw stream comprising isoprene and a minor amount of other five carbon atom hydrocarbons; condensing said first overhead stream; returning a portion of the thus condensed first overhead stream into an upper portion of said fractionation zone as reflux therefor; introducing the remainder of said condensed first overhead stream and said kettle product into said dehydrogenation zone; introducing said sidedraw stream into an extractive distillation zone and therein contacting said sidedraw stream with a selective polymerization solvent selected from the group consisting of aromatic hydrocarbons having from 6 to 8 carbon atoms per molecule, cycloparaffinic hydrocarbons having from 5 to 8 carbon atoms per molecule and cycloolefinic hydrocarbons having from 5 to 8 carbon atoms per molecule; withdrawing from said extractive distillation zone a second overhead stream comprising five carbon atom hydrocarbons; condensing said second overhead stream; returning a portion of the thus condensed second overhead stream into an upper portion of said extractive distillation zone as reflux therefor; passing the remainder of the said condensed second overhead stream into said dehydrogenation zone; and withdrawing from said extractive distillation zone a bottoms product comprising isoprene and solvent.

15. A process in accordance with claim 14 further comprising controlling the rate of flow of said remainder of the reaction effluent into said fractionation zone substantially constant, controlling the rate of withdrawal of said first overhead stream responsive to the pressure of the vapors in an upper portion of said fractionation zone, controlling the rate of flow of said portion of said condensed first overhead stream into said fractionation zone to maintain the rate of flow of internal reflux in said fractionation zone substantially equal to a desired value, manipulating said desired value responsive to the concentration of isoprene in said first overhead stream to maintain said concentration at a predetermined value, producing a first signal representative of the rate of flow of isoprene in said remainder of said reaction effluent introduced into said fractionation zone, establishing a second signal representative of the rate of flow of isoprene in said sidedraw stream, controlling the rate of flow of said sidedraw stream responsive to the ratio of said second signal to said first signal, and controlling the rate of flow of said kettle product responsive to the concentration of isoprene in said kettle product to maintain the concentration of isoprene in said kettle product at a predetermined value.

16. A process in accordance with claim 14 further comprising controlling the rate of flow of said remainder of the reaction effluent into said fractionation zone substantially constant, controlling the rate of withdrawal of said first overhead stream responsive to the pressure of the vapors in an upper portion of said fractionation zone, controlling the rate of flow of said portion of said condensed first overhead stream into said fractionation zone to maintain the rate of flow of internal reflux in said fractionation zone substantially equal to a desired value, manipulating said desired value responsive to the concentration of isoprene in said first overhead stream to maintain said concentration at a predetermined value, controlling the rate of flow of said kettle product responsive to the concentration of isoprene in said kettle product to maintain the concentration of isoprene in said kettle product at a predetermined value, and controlling the rate of flow of said sidedraw stream responsive to the difference between the rate of flow of said remainder of said reaction effluent and the sum of the rates of flow of said remainder of said condensed first overhead stream and said kettle product.

17. A process in accordance with claim 14 further comprising controlling the rate of introduction of said selective polymerization solvent into said extractive distillation zone responsive to the concentration of isoprene in said second overhead stream, and controlling the rate of withdrawal of said bottoms product responsive to the ratio of isoprene to solvent therein to maintain said ratio substantially constant.

References Cited by the Examiner

UNITED STATES PATENTS

| | | | |
|---|---|---|---|
| 2,465,363 | 3/1949 | Faragher et al. | 260—95 |
| 2,914,588 | 11/1959 | Dempsey | 260—683.3 |
| 2,925,452 | 2/1960 | Broughton | 260—681.5 |
| 2,952,671 | 9/1960 | Cottle | 260—94.2 |
| 2,982,795 | 5/1961 | Owen | 260—681.5 |
| 2,990,437 | 6/1961 | Berger | 202—160 |
| 3,049,413 | 8/1962 | Sifford | 23—285 |
| 3,065,218 | 11/1962 | Greene | 260—94.2 |
| 3,091,518 | 5/1963 | Kizer et al. | 23—285 |
| 3,119,800 | 1/1964 | Moss et al. | 260—94.2 |

JOSEPH L. SCHOFER, *Primary Examiner.*

LEON J. BERCOVITZ, *Examiner.*

C. R. REAP, H. I. CANTOR, *Assistant Examiners.*